No. 795,963. PATENTED AUG. 1, 1905.
R. K. DENT & H. M. & M. FOUT.
WAGON FOR TRANSPORTING HEAVY MATERIALS.
APPLICATION FILED OCT. 1, 1904.
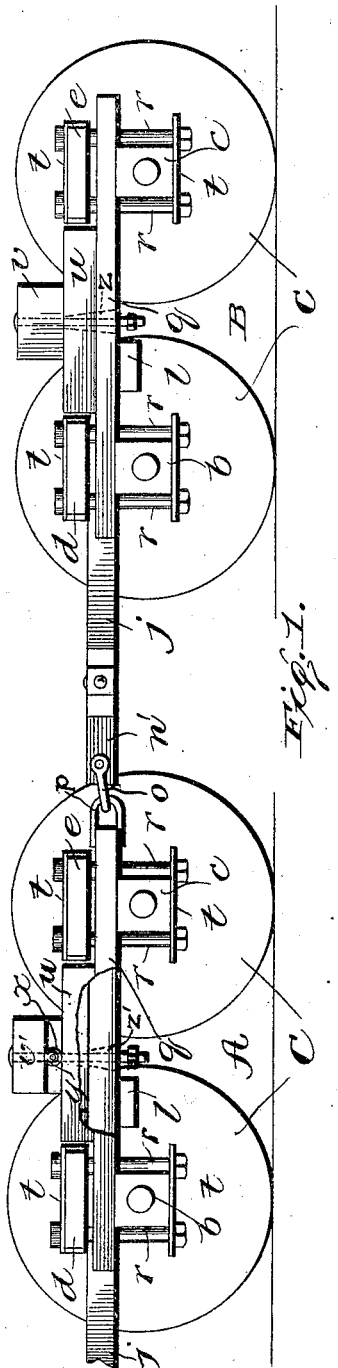
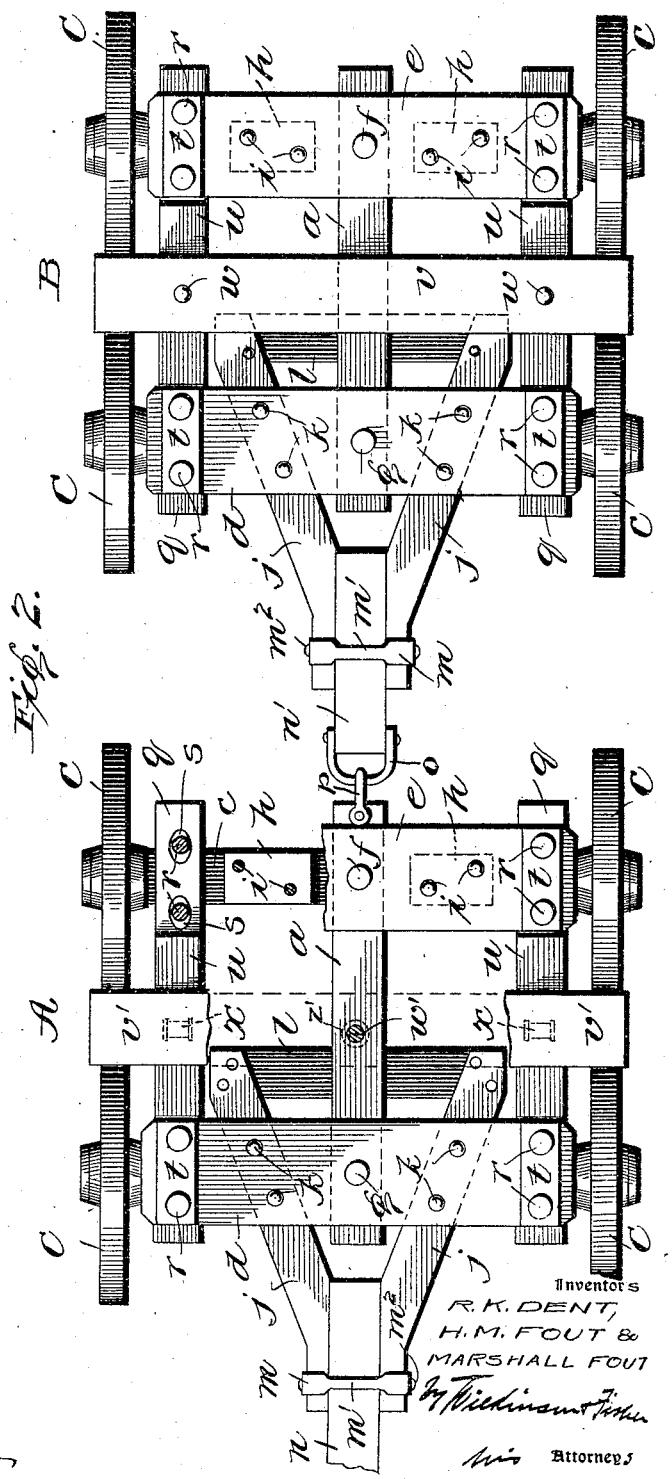

UNITED STATES PATENT OFFICE.

ROBERT K. DENT, HENRY M. FOUT, AND MARSHALL FOUT, OF NEWTON, MISSISSIPPI.

WAGON FOR TRANSPORTING HEAVY MATERIALS.

No. 795,963.      Specification of Letters Patent.      Patented Aug. 1, 1905.

Application filed October 1, 1904. Serial No. 226,861.

*To all whom it may concern:*

Be it known that we, ROBERT KENNON DENT, HENRY M. FOUT, and MARSHALL FOUT, citizens of the United States, residing at Newton, in the county of Newton and State of Mississippi, have invented certain new and useful Improvements in Wagons for Transporting Heavy Materials; and we do hereby declare the following to be a full, clear, and exact description of the invention, such as will enable others skilled in the art to which it appertains to make and use the same.

This invention relates to vehicles, more particularly to the running-gear thereof, and is particularly designed for use on eight-wheel wagons which are especially adapted for hauling logs, timber, and other bulky and heavy material.

The objects of the invention are to improve upon the construction of such wagons for the purpose of increasing their life and efficiency of operation, with simplicity of parts and cheapness of manufacture.

Other objects of the invention are to construct an eight-wheel vehicle so that the trucks thereof will be supple and will give or yield both vertically and laterally without deteriorating from their stability, enabling any of the wheels to have free vertical movement in passing obstructions without materially increasing the load strain on the wheels.

To the accomplishment of these objects and such others as may hereinafter appear the invention comprises the novel construction and combinations of parts having the general mode of operation substantially as hereinafter described and claimed in the specification, and shown in the accompanying drawings, illustrating the preferred embodiment thereof, in which—

Figure 1 shows a side elevational view of both trucks of an eight-wheel wagon with the nigh wheels removed; and Fig. 2 shows a plan view of Fig. 1, having portions broken away to illustrate otherwise hidden details of construction.

Referring to the drawings, A and B represent the forward and rear trucks of an eight-wheeled wagon, each supported by wheels C. These trucks are built substantially alike, except in matters of detail to be pointed out later, and therefore a description of one will suffice for both.

On the under side of a central longitudinal beam or reach $a$ are mounted an axle $b$ for the forward pair of wheels and an axle $c$ for the rear pair of wheels, and to the upper side of the reach $a$, and preferably mounted directly over the axles $b$ and $c$, are forward and rear transverse beams $d$ and $e$ of a suitable length to fit conveniently within the space between the wheel-hubs. A single bolt or pin $g$ is passed through the beam $d$, forward end of reach $a$, and axle $b$, and in like manner the beam $e$, axle $c$, and rear end of reach $a$ are secured together with a single bolt or pin $f$. It is readily seen that such a connection allows of an adjustment of one set of wheels transversely relatively to the other. This transverse adjustment is limited in a manner hereinafter described.

A secure and permanent connection between the transverse beam $e$ and the axle $c$ is accomplished by mounting between them, preferably on each side of the reach $a$, bearing-blocks $h$ of substantially the same thickness as the reach $a$ and secured in position by bolts $i$. This same function is obtained for the transverse beam $d$ and axle $b$ by means of the hounds $j$, which extend between these members on each side of the reach $a$ and are secured in position by bolts $k$ and a transverse brace $l$, preferably extending beneath the reach $a$. Between the hounds $j$ of the forward truck is pivotally mounted on the bolt or pin $m^2$ the wagon-tongue $n$, while on the rear truck this is cut to form a short connecting-piece $n'$, provided on its end with a clevis $o$, linked through a clevis $p$ on the end of the reach $a$ of the forward truck. A strong connection between the hounds and tongue is obtained by means of a metal band $m$, which is preferably flat on the end portions and provided with rounded side portions $m'$ at points above and below the tongue. By such a construction an ample movement of the tongue is obtained and the parts are bound securely together. The bolt or pin $m^2$ passes through the flat ends of the inclosing band. By this arrangement in order to turn the wagon the forward truck A has to be slued around, and by giving the tongue a movement in a vertical plane only all danger of injuring the cattle yoked thereon by its swinging transversely and beating against them is eliminated.

In addition to the adjustment afforded the frame by means of the connections at $f$ and $g$ a further adjustment—that is, a vertical movement of any part of the frame—is obtained by means of the following construction, which also limits the amount of transverse adjustment: On each truck, with their ends projecting beyond the axles thereof and mounted between the axles and transverse beams, are side beams $q$, which are of a less thickness than the reach $a$ and are therefore allowed a vertical play in the space between the axles and transverse beams. The preferable means of securing these side beams loosely in position, so that the proper amount of vertical movement may be at all times obtained, is by the use of a pair of bolts $r$, extending through enlarged holes $s$ in the side beams and held closely against the sides of the axles by means of properly-spaced apertures in the transverse beams through which they pass and cross-ties or links $t$ both at the top and bottom. It is obvious that many forms of connecting-bolts may be used for retaining the side beams $q$ loosely within the spaces between the transverse beams $d$ and $e$ and axles $b$ and $c$; but the main idea is to obtain a connection which is durable, yet will allow of the desired play between the parts of the running-gear. With such a construction if any wheel passes over a stone or other obstruction only the corner of the truck supported by that wheel is affected, and the main frame is thus eased from undue strains.

The main distinctive feature between the two trucks is in the manner of mounting the means for supporting the load to be carried. On the upper side of each side beam of each of the trucks and between the transverse beams may be secured a block $u$, and for the rear truck on such blocks is mounted a bolster $v$ by means of a single bolt or pin $w$ at each end thereof, thus preserving the transverse adjustability of the frame of the truck. On the central reach of the forward truck is mounted a bolster $v'$ of similar proportions to bolster $v$, but secured by a single bolt or pin $w'$ passing through the reach $a$. The ends of bolster $v'$ are mortised on their under side, and in each of the recesses thus formed is mounted an antifriction-roller $x$ in any suitable form of hanger $y$, which rollers run upon blocks $u$. By this construction when the wagon is loaded by logs extending across the two bolsters and a turn is made by sluing around the forward truck the bolster $v'$ is retained in a position parallel to the bolster $v$ and the equilibrium of the load is undisturbed. Of course the bolts $w$ and $w'$ are given a loose connection in any well-known manner with the respective parts of the running-gear with which they engage—for instance, by passing said bolts through tapering openings $z$ in the side beams of the rear truck and a similar opening $z'$ in the reach of the forward truck, Fig. 1—otherwise the suppleness and vertical yield of the parts thereof would be rendered $nil$.

Obviously some features of this invention may be used without others, and therefore we do not desire to be understood as limiting ourselves to the details of construction and arrangement of parts as herein described and illustrated, as it is manifest that the invention may be embodied in widely-varying forms in the adaptation of the wagon to various conditions of use without departing from the spirit of our improvements. We therefore reserve the right to all such variations and modifications as properly fall within the scope of our invention and the terms of the following claims.

We claim—

1. In a vehicle, a truck comprising a centrally-disposed reach, axles mounted on the under side thereof, transverse beams mounted on the upper side thereof over said axles, and side beams extending substantially parallel to said reach constructed to have a vertical play between the ends of said axles and transverse beams, substantially as described.

2. In a vehicle, a truck comprising a pair of axles, a centrally-disposed reach extending therebetween, a transverse beam mounted over each of said axles, a pivot-pin passing through each end of said reach and its respective axle and transverse beam, and side beams extending substantially parallel to said reach constructed to have a vertical play between the ends of said axles and transverse beams, substantially as described.

3. In a vehicle, a truck comprising a pair of axles, bearing-pieces on said axles and transverse beams on said bearing-pieces, each axle rigidly secured to its respective bearing-pieces and beam, a centrally-disposed reach connecting the axles its ends extending between said axles and beams and there pivotally secured, and side beams extending substantially parallel to said reach constructed to have a vertical play between the ends of said axles and transverse beams, substantially as described.

4. In a vehicle, a truck comprising a centrally-disposed reach, axles mounted on the under side thereof, transverse beams mounted over said axles on the upper side thereof, side beams extending between the ends of said axles and transverse beams, and means for securing said side beams loosely in position, comprising bolts extending through enlarged holes in said side beams with means for holding said bolts in position, substantially as described.

5. In a vehicle, a truck comprising a centrally-disposed reach, axles mounted on the under side thereof, transverse beams mounted over said axles on the upper side thereof, side beams extending between the ends of said axles and transverse beams, and means for securing said side beams loosely in position comprising bolts extending on each side of said axles through enlarged holes in said side beams with cross-ties for holding said bolts in position, substantially as described.

6. In a vehicle, a truck comprising a centrally-disposed reach, axles mounted on the under side thereof, transverse beams mounted over said axles on the upper side thereof, side beams of lesser thickness than said reach extending between the ends of said axles and transverse beams and means for loosely holding said side beams in position, substantially as described.

In testimony whereof we affix our signatures in presence of two witnesses.

ROBERT K. DENT.
    HENRY M. FOUT.
    MARSHALL FOUT.

Witnesses:
 J. M. COLE,
 W. D. M. RANER.